S. S. HENDERSON.
Wagon Brake.

No. 77,190.                                Patented April 28, 1868.

Witnesses:
E. Roughton.
Geo. Cheese.

Inventor:
Smith S. Henderson
By Attorneys J. B. Woodruff & Son.

United States Patent Office.

SMITH S. HENDERSON, OF NORTH COHOCTON, NEW YORK.

Letters Patent No. 77,190, dated April 28, 1868.

IMPROVED WAGON-BRAKE.

*The Schedule referred to in these Letters Patent and making part of the same.*

TO ALL WHOM IT MAY CONCERN:

Be it known that I, SMITH S. HENDERSON, of North Cohocton, in the county of Steuben, in the State of New York, have invented certain new and useful Improvements in Self-Acting Wagon-Brakes; and the following is a full, clear, and exact description of the same, reference being had to the accompanying drawings, making a part of this specification, in which—

Figure 1:
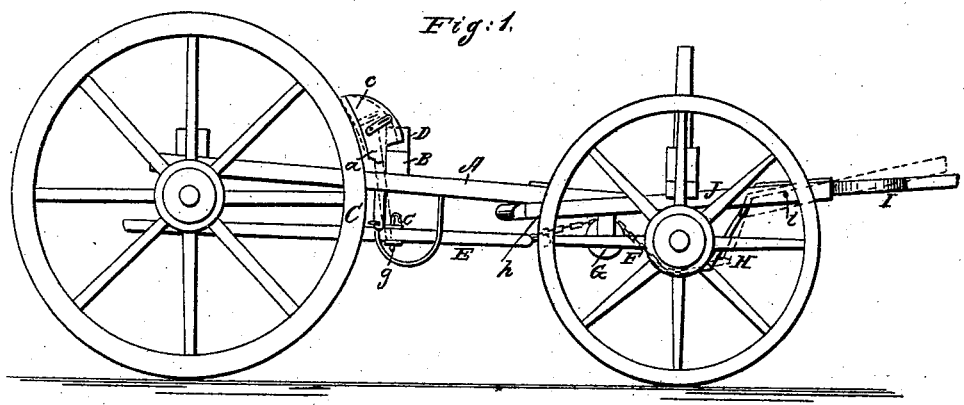
Figure 1 represents a side view of the wagon, showing the manner of applying and the mode of operating the brakes.
Figure 2:
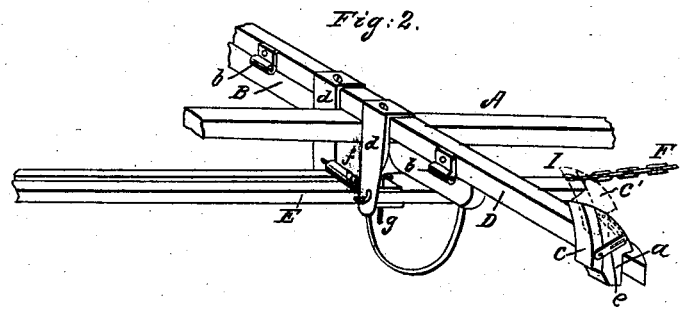
Figure 2 shows an enlarged perspective view of the perch or reach, with the mode of hinging the brake-bar and brakes, also the sliding bar and connecting-chain.
Figure 3:
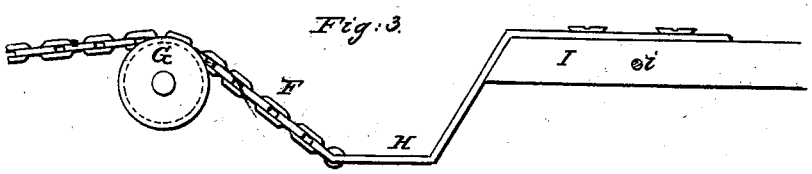
Figure 3 is an enlarged view of the connecting-chain, friction-roller, and crooked metal bar attached to the pole or wagon-tongue.

The object of my invention is efficiency and durability, and it consists in the construction, arrangement, and combination of the several parts as connected, to operate in the manner hereinafter specified.

To enable others to make and use my improvements, I will describe them more fully, referring to the drawings, and to the letters marked thereon.

My improved self-acting brake may be easily applied to any ordinary farm-wagon by securing to the reach or perch A, a bar of timber, B, across the reach and braces, just forward of the perpendicular line of the periphery of the back wheels C. On the top of the cross-timber B is secured, by hinges $b$ $b$, the brake-bar D, to the ends of which are firmly bolted the blocks $a$ $a$, to which are fitted the wedge-shaped brake-block $c$ $c$, so notched on to the blocks $a$ $a$ as to bear firmly on the tire of the wheel when the brake is applied, and the wagon moving forward, the brake-block $c$ being hinged to the block $a$ by slotted straps $e$ $e$, on each side, so that the brakes $c$ $c$ will be lifted up and their pressure relieved from the wheels C C, when the wagon is backed. To the central portion, on the rear of the brake-bar D, are secured two straps of metal $d$ $d$, extending down on both sides of the reach A, and a sliding bar, E, underneath, to which the straps $d$ $d$ connect by a movable plate-hinge, $f$, and a bolt and nut, $g$, so that the plate-hinge $f$ may be varied on the slide-bar E, there being a slit in the bar for that purpose, by which the amount of pressure on the brakes may be adjusted to the wheels; the straps $d$ $d$ forming the levers to operate the brakes. To the forward end of the slide E is fastened a hook, $h$, to which is attached a chain, F, passing over a roller, G, and down under the forward axle, where it connects with the rear end of a metal bar, H, which is so shaped that the rear end is free to move under the centre of the axle; the bar H being bent up and over, so that the forward end is fastened on to the top of the rear end of the tongue or pole I, which is attached by a long pin or bolt, $i$, between the hounds J J, in the usual manner; the pin $i$ being the fulcrum; the pole I being the lever to operate the brakes, which is done simply by the moving of the end of the pole up, to bring the brakes against the wheels, and down to relieve them.

The movement by which the hind wheels C are held from rolling, when descending a steep hill or an inclined plane, is the most natural, and quite as certain as any method hitherto known. The wagon-tongue or pole, when hitched to the neck-yoke of a team in harness, is elevated at the forward end, and the tendency is always to throw up, when the weight of the wagon or load bears or presses forward on to the team in going down hill; and it will readily be seen that by this movement simply, the most certain and efficient action on the brakes is produced by the arrangement and combination of the mechanism above described.

The advantages are, that my improvements can be put on to any wagon, without altering or changing any part of the running-gear; the bent metal bar H being secured to the pole, the roller G secured to the under side of the reach A, the chain F connecting the slide E with the pole I, so that by lifting the end a short distance, the brakes are brought in contact with the wheels.

It is practically demonstrated that the harder the forward pressure is, the greater force is applied to the brake-blocks, so that there is no danger of a heavily-loaded wagon running on to the team, and when the wagon is backed up, the wheels rolling the reverse way, instantly relieve the brakes, so that every obstacle to the perfect operation of self-acting brakes is removed.

What I claim as my invention, and desire to secure by Letters Patent, is—

1. The arrangement and combination of the wagon-tongue or pole I, bent metal bar H, chain F, roller G, and slide-bar E, to connect with the brake-bar D, for operating in the manner herein described.

2. I claim the brake-blocks $c\ c$ and $a\ a$, hinged together with slotted straps $e\ e$, as constructed and secured to the hinged brake-bar D, the same being connected by levers $d\ d$ with the slide E, by a plate-hinge, $f$, so as to adjust the pressure of the brakes to the wheels, substantially as and for the purposes set forth.

In testimony whereof, I hereunto subscribe my name in the presence of—

SMITH S. HENDERSON.

Witnesses:
  A. ADAMS,
  H. C. PIERCE.